(12) United States Patent
Berg (10) Patent No.: US 9,458,842 B2
(45) Date of Patent: Oct. 4, 2016

(54) CLOSED LOOP DRIVE CIRCUIT WITH EXTERNAL BRAKE ASSIST

(75) Inventor: Torsten Berg, Steina (DE)

(73) Assignee: Caterpillar Inc., Peoria, IL (US)

( * ) Notice: Subject to any disclaimer, the term of this patent is extended or adjusted under 35 U.S.C. 154(b) by 596 days.

(21) Appl. No.: 13/989,712

(22) PCT Filed: Dec. 9, 2011

(86) PCT No.: PCT/EP2011/006231
§ 371 (c)(1),
(2), (4) Date: Oct. 2, 2013

(87) PCT Pub. No.: WO2012/079732
PCT Pub. Date: Jun. 21, 2012

(65) Prior Publication Data
US 2014/0023523 A1 Jan. 23, 2014

(30) Foreign Application Priority Data

Dec. 17, 2010 (EP) .................................... 10195815

(51) Int. Cl.
*F16D 31/02* (2006.01)
*F04B 17/05* (2006.01)
(Continued)

(52) U.S. Cl.
CPC ............... *F04B 17/05* (2013.01); *B60T 10/04* (2013.01); *B60T 17/02* (2013.01); *E02F 9/2235* (2013.01);
(Continued)

(58) Field of Classification Search
CPC ........... F16H 61/4017; F16H 61/4148; F16H 61/4157; F16H 61/46; F16H 61/465; B60T 10/04
See application file for complete search history.

(56) References Cited

U.S. PATENT DOCUMENTS 5,203,168 A * 4/1993 Oshina .................... F16H 61/46
60/488
5,946,910 A 9/1999 Hayashi et al.
(Continued)

FOREIGN PATENT DOCUMENTS

CN   101287876 A   10/2008
DE   2 142 946     3/1973
(Continued)

OTHER PUBLICATIONS

English-language International Search Report from European Patent Office for International Application No. PCT/EP2011/006231, mailed Mar. 1, 2012.
(Continued)

*Primary Examiner* — Michael Leslie
(74) *Attorney, Agent, or Firm* — Finnegan, Henderson, Farabow, Garrett & Dunner, LLP (57) ABSTRACT

A hydrostatic drive system for a vehicle (10) comprises an open circuit (100), a closed travel circuit (120), an electronic controller (320), and a main variable displacement hydraulic pump (102) driven by an internal combustion engine (12) equipped with a speed sensor (350). The main variable displacement hydraulic pump may be configured to supply hydraulic fluid to a hydraulic consumer (34, 44, 50) via a hydraulic supply line (106). A pressure relief valve (118) may be connected to a reservoir (300) and may be permanently connected to the hydraulic supply line of the open circuit. The electronic controller may be configured to run a strong braking mode in which the electronic controller at least partially increases the displacement of the main variable displacement hydraulic pump such that hydraulic fluid is discharged via the permanently connected pressure relief valve into the reservoir if the sensed engine speed is higher than a predetermined maximum engine speed.

16 Claims, 3 Drawing Sheets

(51) Int. Cl.
- *B60T 10/04* (2006.01)
- *B60T 17/02* (2006.01)
- *E02F 9/22* (2006.01)
- *F15B 11/17* (2006.01)
- *F16H 61/4017* (2010.01)
- *F16H 61/4148* (2010.01)
- *F16H 61/4157* (2010.01)

(52) U.S. Cl.
CPC ........... *E02F 9/2253* (2013.01); *E02F 9/2289* (2013.01); *E02F 9/2292* (2013.01); *E02F 9/2296* (2013.01); *F15B 11/17* (2013.01); *F16H 61/4017* (2013.01); *F16H 61/4148* (2013.01); *F16H 61/4157* (2013.01); *F15B 2211/20523* (2013.01); *F15B 2211/20546* (2013.01); *F15B 2211/20569* (2013.01); *F15B 2211/20576* (2013.01); *F15B 2211/251* (2013.01); *F15B 2211/50536* (2013.01); *F15B 2211/633* (2013.01); *F15B 2211/6652* (2013.01); *F15B 2211/6653* (2013.01); *F15B 2211/7058* (2013.01); *F15B 2211/7142* (2013.01); *F15B 2211/85* (2013.01)

(56) References Cited

U.S. PATENT DOCUMENTS

| | | |
|---|---|---|
| 6,202,783 B1 | 3/2001 | Taylor et al. |
| 6,338,247 B1 | 1/2002 | Drin |
| 6,339,928 B1 | 1/2002 | Göllner |
| 6,360,537 B1 | 3/2002 | Widemann |
| 6,644,025 B1 | 11/2003 | Oberhäusser et al. |
| 6,688,419 B2 | 2/2004 | Eriksen et al. |
| 7,607,298 B2 | 10/2009 | Schniederjan et al. |
| 2007/0295004 A1 | 12/2007 | Schniederjan et al. |
| 2008/0256939 A1 | 10/2008 | Lemaire et al. |
| 2010/0050620 A1 | 3/2010 | Basana et al. |

FOREIGN PATENT DOCUMENTS

| | | |
|---|---|---|
| DE | 103 04 917 A1 | 8/2004 |
| GB | 2 205 632 | 12/1988 |
| GB | 2 275 761 | 9/1994 |
| WO | WO 2009/084853 A2 | 7/2009 |

OTHER PUBLICATIONS

English-language European Search Report from the Munich Patent Office for EP 10 19 5815, date of completion of search May 19, 2011.

\* cited by examiner

CLOSED LOOP DRIVE CIRCUIT WITH EXTERNAL BRAKE ASSIST

CLAIM FOR PRIORITY

This application is a U.S. National Phase entry under 35 U.S.C. §371 from PCT International Application No. PCT/EP2011/006231, filed Dec. 9, 2011, which claims benefit of priority of European Patent Application No. EP 10195815.5, filed Dec. 17, 2010.

TECHNICAL FIELD

The present disclosure refers to a hydrostatic drive system for a vehicle, and particularly to a hydrostatic drive system comprising an open hydraulic circuit including a main hydraulic pump configured to be driven by an internal combustion engine and to drive at least one hydraulic consumer, and a closed hydraulic circuit including an auxiliary hydraulic pump configured to drive an hydraulic motor for travelling the vehicle.

Furthermore, the present disclosure refers to a method for braking a vehicle, particularly a self-propelled construction machine such as, e.g., a wheel excavator.

BACKGROUND

Vehicles such as, e.g., self-propelled construction machines, having a hydrostatic drive are generally exposed to extreme fluctuations with regard to the load to be handled and with regard to the vehicle speed to be realized. Frequent and rapid braking of the vehicle is therefore necessary. In particular, the wear of the conventional brakes is therefore relatively high. In the case of vehicles having hydrostatic drives, the vehicle is often braked by an infinitely variable change in the transmission ratio. However, the rotational speed of the internal combustion engine providing the requisite drive power is increased in order to absorb the kinetic energy of the vehicle during the braking operation. This increase in the rotational speed is detrimental to the service life of the internal combustion engine and in addition leads to generally unacceptable high noise emissions.

A common hydraulic circuit construction design for working machines is, e.g., known from WO 2009/084853 A2.

U.S. Pat. No. 6,644,025 B1 shows a control arrangement which is used to supply at least two hydraulic consumers with pressure medium.

An electric oil pressure system of a construction equipment is known from WO 2009/084853 A2.

US 2008/0256939 A1 shows a device for managing the displacement of a hydraulic motor or a group of hydraulic motors.

U.S. Pat. No. 6,688,419 discloses another vehicle hydraulic driving system including a closed hydraulic circuit with a hydraulic pump and a hydraulic motor. A leakage fluid outlet opening of the hydraulic motor and a valve arrangement are connected with a release chamber. In the release position of the braking control valve, the valve arrangement maintains a pressure in the release chamber corresponding at least to the release pressure of the braking device.

US 2010/0050620 A1 refers to a method of braking a hydrostatic drive machine. This method includes the steps of reducing a displacement of a pump of a hydrostatic drive system to a non-zero displacement, and increasing a displacement of a motor of the hydrostatic drive system to a displacement that is less than a maximum displacement. In a further step, an engine of the hydrostatic drive system is accelerated toward a desired engine speed range.

U.S. Pat. No. 5,946,910 shows a hydraulic circuit of a hydraulically driven working vehicle. A hydraulic circuit has a hydraulic travel pump and a working machine hydraulic pump which are driven by the power of an engine for discharging pressurized oil to a HST travel circuit and a working machine-driving hydraulic circuit, respectively. Pressurized oil from the working machine hydraulic pump joins pressurized oil from the hydraulic travel pump to effect high-speed travelling, while pressurized oil from the hydraulic travel pump joins pressurized oil in the working machine hydraulic pump to generate a large digging force to effect digging. The hydraulic circuit including the hydraulic travel pump and the working machine hydraulic pump is configured as an open hydraulic circuit.

Another hydrostatic drive including a hydraulic pump and at least one hydraulic engine is shown in U.S. Pat. No. 7,607,298 B2. The hydraulic engine is contacted to a closed circuit via a first working line and a second working line. In order to limit the swept volume flowing in one of the two working lines towards the hydraulic pump, a volume flow divider is provided in the working line and allows to remove a partial volume flow from the working line.

U.S. Pat. No. 6,338,247 B1 shows a hydraulic vehicle drive having a closed hydraulic circuit consisting of a variable displacement pump and one or several hydraulic motors. The variable displacement pump is driven by a diesel engine. During the braking or pushing operation of the vehicle, the hydraulic motor operates as pump and drives the variable displacement pump which, in turn, acts as a motor upon the diesel engine and acts to accelerate the latter. Thus, the intended braking effect prevents the danger that the diesel engine will reach non-permissible high revolutions per unit time, which is particularly dangerous for diesel engines with turbochargers. In order to prevent non-permissible high revolutions per unit time, a pressure regulator acting as a throttle is placed in the return line between the hydraulic motor and the variable displacement pump. The valve throttles the rate of flow when the pressure of the hydraulic fluid in the line exceeds a certain desired value during the braking operation.

A very similar system for controlling a hydraulic vehicle drive is shown in U.S. Pat. No. 6,360,537 B1. Here, braking takes place in a control member by a sequence valve being arranged in a line between the hydraulic motor and a variable displacement pump. Again, the hydraulic pump, the hydraulic motor, and the sequence valve are arranged in a closed hydraulic circuit.

U.S. Pat. No. 5,946,910 shows a hydraulic circuit for a hydraulically driven working vehicle which allows the vehicle to travel at an almost constant speed during high-speed travelling. The shown hydraulic circuit has a hydraulic travel pump and a working machine hydraulic pump which are driven by the power of an engine for discharging pressurized oil to an HST travel circuit and a working machine driving hydraulic circuit, respectively. Pressurized oil from the working machine hydraulic pump joins pressurized oil from the hydraulic travel pump to effect high-speed travelling, while pressurized oil from the hydraulic travel pump joins pressurized oil in the working machine hydraulic pump to generate a large digging force to effect digging. Again, all hydraulic circuits are designed as open hydraulic circuits.

GB 2 275 761 A refers to a vehicle with a hydrostatic drive. During braking of such a vehicle, an adjustable hydraulic motor of a hydrostatic propulsion drive is adjusted in the direction of the greatest possible capacity and a kinetic energy of the vehicle is partly directed into a prime moved and partly dissipated by pressure limiting valves in the closed working circuit of the hydrostatic drive. Accordingly, the hydrostatic circuit fluid is directed from the high pressure to the low pressure side via one or more pressure limiting valves. Thus, the kinetic energy of the vehicle is dissipated both by increasing the rotary speed of the prime mover and by throttling at the pressure limiting valve, the major part of the kinetic energy being converted at the pressure limiting valve into heating of the fluid.

If a construction machine as, e.g., a fork stacker, has no conventional service brake, the hydrostatic traction drive is utilized as a brake. Thus, all the kinetic energy of the vehicle, during braking or deceleration of the latter, is directed via the hydrostatic transmission to the internal combustion engine, which typically is a diesel engine. Since the internal combustion engine only has limited power absorption, a large proportion of the vehicle energy is transmitted into the flywheel, so that the rotational speed increases considerably. The problem described occurs in relation to the vehicle speed, its mass and the requisite braking deceleration.

It has therefore become known to provide a retarder drive, by means of which additional energy can be converted into heat. In wheeled loaders and off-highway stackers, because of considerably higher travel speeds to be achieved, conventional service brakes are also provided. In addition to the conventional service brakes, a retarder device, which works in parallel with the service brake, is provided in these vehicles. The retarder device serves in principle to reduce the brake wear and enables the vehicle to travel a longer distance on a gradient without reaching the critical temperature of the service brake. A feature common to the existing systems during the function of the retarder is a purely mechanical drive branch, so that the kinetic energy of the vehicle can pass to the variable displacement pump.

A principal object of U.S. Pat. No. 6,202,783 B1 is to provide a vehicle having a permanent hydrostatic traction drive wherein a retarder valve device provided instead of or in addition to a brake device, may work essentially free of wear, the internal combustion engine may be not overloaded, and the number of components for this arrangement may be reduced. The known hydrostatically driven vehicle has a variable displacement hydraulic pump and a hydraulic motor in a closed circuit. An internal combustion engine for driving the hydraulic pump and a variable displacement pump producing a volumetric output flow are connected in an open circuit. A pressure relief valve for avoiding a pressure in the open circuit above a maximum operation pressure is permanently connected to a hydraulic supply line to the hydraulic consumers. A retarder valve arranged in the open circuit is intended for the hydraulic absorption of braking energy. The retarder valve has a valve and a pressure limiting valve connected thereto, for throttling the volumetric output flow of the variable displacement pump. The variable displacement hydraulic pump, the variable displacement pump and the retarder valve are controlled by a digital electronic unit for the respective driving and working functions.

The retarder valve of U.S. Pat. No. 6,202,783 B1 including a valve and a pressure limiting valve may increase the overall manufacturing costs; particularly the costs for the valve and the associated pressure limiting valve additionally provided to the pressure relief valve permanently connected to the hydraulic supply line may be costly. In addition, the closed loop control system including the retarder valve unit may be prone to oscillations.

GB 2 205 632 A shows a drive device for driving a fork lift truck. The drive device comprises a primary energy source, a hydrostatic transmission and a pump for charging consumers with hydraulic energy. A deliberately actable valve is connected between the pump and the consumer. If braking occurs via the hydrostatic transmission and as a result the speed of the internal combustion engine is driven up, the pump is swung out to full delivery current. The pump delivers said full delivery current against pressure to which a pressure limiting valve is set. Delivery current is drained to this pressure limiting valve into a container with the consequence that the energy converted in the pump to generate the full delivery current against the pressure of the pressure limiting valve is converted as additional braking energy. Due to fact that the pressure limiting valve is connected in parallel with switching valves, none of the consumers can be charged with a higher pressure than the pressure to which the pressure limiting valve is set. The close circuit of this drive device includes two non-variable hydraulic motors. Accordingly, additional braking energy can only be obtained by swinging out the pump. Accordingly, the additional breaking energy, which can be obtained, is limited.

A hydraulic drive system without a separation in open and closed circuits is shown in US 2010/0050620 A1.

DE 103 04 917 A1 shows a similar hydrostatic transmission.

U.S. Pat. No. 6,360,537 B1 describes a system for controlling a hydraulic vehicle drive comprising solely a closed circuit without any consumers.

DE 2 142 946 refers to a hydrostatic system which is not usable as a hydrostatic drive system.

U.S. Pat. No. 6,339,928 B1 describes a system for controlling a hydraulic propulsion drive. Here, open and closed circuits are hydraulically connected with each other. The open circuit only serves to compensate any leakage of hydraulic fluid The present disclosure is directed, at least in part, to improving or overcoming one or more aspects of the prior systems.

SUMMARY OF THE DISCLOSURE

In one aspect the present disclosure is directed to a hydrostatic drive system for a vehicle. The hydrostatic drive system for a vehicle may comprise an open circuit, a closed circuit, and an electronic controller. The open circuit may include a main variable displacement hydraulic pump configured to be driven by an internal combustion engine equipped with a speed sensor. The main variable displacement hydraulic pump may be configured to supply hydraulic fluid to at least one hydraulic consumer via a hydraulic supply line. A pressure relief valve may be connected to a reservoir. The pressure relief valve may be permanently connected to the hydraulic supply line such that hydraulic fluid in the hydraulic supply line is discharged into the reservoir if a preset pressure level is reached in the open circuit. A closed circuit may be configured to travel the vehicle and may include an auxiliary variable displacement hydraulic pump configured to be driven by the internal combustion engine, and a hydraulic motor connected to the auxiliary variable displacement hydraulic pump. The electronic controller may be connected to the speed sensor and the main variable displacement hydraulic pump. The electronic controller may be configured to run a strong braking mode in which the electronic controller may at least partially increases the displacement of the main variable displacement hydraulic pump such hydraulic fluid is discharged via the pressure relief valve into the reservoir, if an engine speed is determined, based on a signal received from the speed sensor, which is higher than a predetermined maximum engine speed.

In another aspect the present disclosure is directed to a hydrostatic drive system for a vehicle as described above, but including an amended electronic controller. The electronic controller may be connected to the speed sensor and the main variable displacement hydraulic pump. The electronic controller may be configured to run a strong braking mode in which the electronic controller may control the displacement of the main variable displacement hydraulic pump by increasing and decreasing the displacement such that the engine speed is varying within a predetermined maximum engine speed range including the predetermined maximum engine speed, and hydraulic fluid is discharged via the pressure relief valve into the reservoir if an engine speed is determined, based on a signal received from the speed sensor, which is higher than a predetermined maximum engine speed.

In a third aspect the present disclosure is directed to a vehicle having an open hydraulic circuit for supplying at least one hydraulic consumer, and a closed travel circuit. An electronic controller may be configured to receive a signal indicating an engine speed of an internal combustion engine for driving a main variable displacement pump of the open circuit and a variable displacement travel pump of the closed circuit, and, if an engine speed is determined, based on the signal received, which is higher than a predetermined maximum engine speed, to run a strong braking mode including controlling the displacement of the main variable displacement hydraulic pump by increasing and decreasing the displacement such that the engine speed is varying within a predetermined maximum engine speed range including the predetermined maximum engine speed and hydraulic fluid is discharged via the pressure relief valve into the reservoir.

In a forth aspect the present disclosure is directed to a method of braking a vehicle. The vehicle may comprise an open circuit including a main variable displacement hydraulic pump configured to be driven by an internal combustion engine and to supply hydraulic fluid to at least one hydraulic consumer via a hydraulic supply line, and a pressure relief valve connected to a reservoir. The pressure relief valve may be permanently connected to a hydraulic supply line and may be configured to discharge hydraulic fluid in the hydraulic supply line into the reservoir if a preset maximum operation pressure is reached in the open circuit. The vehicle may also comprise a closed circuit configured to travel the vehicle including an auxiliary variable displacement hydraulic pump configured to be driven by the internal combustion engine, and a hydraulic motor connected to the auxiliary variable displacement hydraulic pump. The method may comprise the steps of receiving a signal indicating the engine speed of the internal combustion engine, and if an engine speed is determined, based on the signal received, which is higher than a predetermined maximum engine speed, running a strong braking mode including increasing the displacement of the main variable displacement hydraulic pump such that hydraulic fluid is discharged via the pressure relief valve into the reservoir.

In a fifth aspect the present disclosure is directed to another method of braking a vehicle having an open hydraulic circuit for supplying at least one hydraulic consumer, and a closed travel circuit. The method may comprise the steps of receiving a signal indicating an engine speed of an internal combustion engine for driving a main variable displacement pump of the open circuit and a variable displacement travel pump of the closed circuit, and, if an engine speed is determined, based on the signal received, which is higher than a predetermined maximum engine speed, running a strong braking mode including controlling the displacement of the main variable displacement hydraulic pump by increasing and decreasing the displacement such that the engine speed is varying within a predetermined maximum engine speed range including a predetermined maximum engine speed, resulting in that hydraulic fluid is discharged into a reservoir via a pressure relief valve permanently connected to a hydraulic supply line of the open circuit for avoiding a pressure in the open circuit above a maximum operation pressure.

With respect to controllability of one of the methods disclosed herein it may be appropriate to run the strong braking mode only if the vehicle may operate in a condition where the hydraulic consumers are not allowed to be operated, e.g. travelling on a public road with a relatively high speed with all implements, i.e. hydraulic consumers, stopped.

All vehicles and methods described herein may be modified by replacing the pressure relief valve by an unloading valve typically provided in a main valve unit for, e.g., an excavator. In this case the main variable displacement pump may work against the unloading valve in addition to or instead of the pressure relief valve and utilize the unloading valve during the strong braking mode for the same purpose as the pressure relief valve, namely to discharge fluid into the reservoir. This may result in that, at strong braking of the vehicle, energy may be dissipated via the open circuit, and an overspeed of the internal combustion engine may be avoided. Simultaneously, the additional retarder device as e.g. known from U.S. Pat. No. 6,202,783 B1 may be omitted.

Another modification of the disclosed methods and vehicles may include adding an unloading valve to the pressure relief valve, i.e. utilizing both valves typically provided in a standard main valve unit for, e.g., an excavator.

Other features and aspects of this disclosure will be apparent from the following description and the accompanying drawings.

DETAILED DESCRIPTION

Reference will now be made in detail to the drawings. Wherever possible, the same reference numeral will be used throughout the drawings to refer to the same or like parts.

Figure 1:
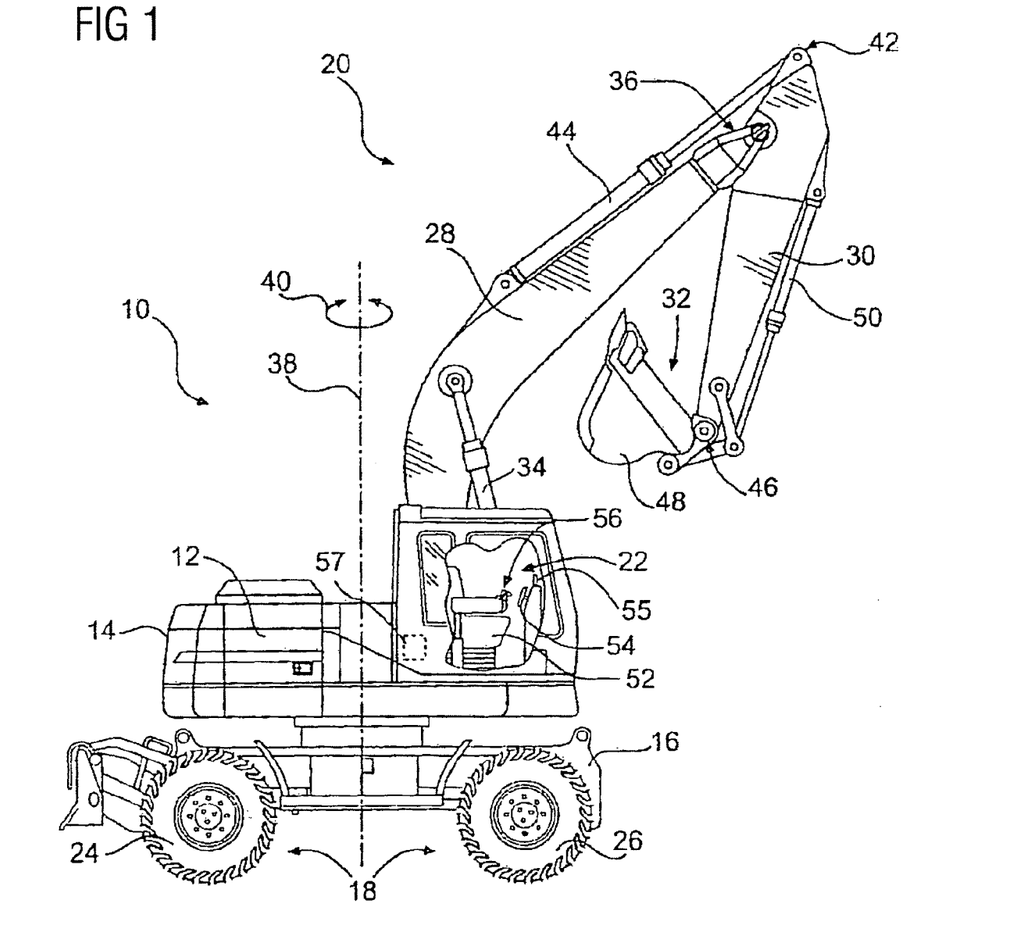
FIG. 1 is a diagrammatic illustration of a wheel excavator configured to travel by means of a hydrostatic drive system according to an exemplary disclosed embodiment.

FIG. 1 shows a vehicle 10 as, e.g., a wheel excavator. Vehicle 10 may include a power source 12, and a frame 14, which may be operably attached to a base 16. Vehicle 10 may also include a traction system 18, e.g. a plurality of wheels 17, which may be operably attached to base 16. In addition, vehicle 10 may include a work implement 20 and an operator station 22 from which work implement 20 may be controlled.

Vehicle 10, although shown in FIG. 1 as a wheel excavator, may be any type of work machine with operator-controlled steering and travelling. For example, vehicle 10 may include wheel loaders, motor graders, backhoe loaders, skid steers, track-type tractors, tracked excavators, and any other type of work machine with operator-controlled steering and travelling.

Frame 14 may be fixedly mounted on base 16. Alternatively, frame 14 may be rotatably mounted on base 16. As yet another alternative, frame 14 may be mounted to base 16 in a slidable fashion or any other configuration. In addition, vehicle 10 may include a cab riser function, by which frame 14 may be raised and lowered relative to base 16. Alternatively or additionally, the cab riser function may cause operator station 22 to be raised and lowered relative to frame 14. The cab raiser function may be hydraulically actuated.

Traction system 18 may include at least one traction device, such as, for example, a first set of wheels 24 and a second set of wheels 26, as shown in FIG. 1. At least one set of wheels may be steerable. Vehicle 10 may be configured with two-wheel or four-wheel steering. Further, a steering configuration may be selectable between two-wheel and four-wheel steering, or the operator may switch which set of wheels is steerable.

While traction system 18 has been shown to include wheels, the present disclosure may also apply to work machines or vehicles with one or more endless tracks and/or belts, or any other type of traction device. In addition, the present disclosure may apply to steering systems that vary a steering angle of one or more traction devices, as well as skid steer, and differential steering systems. Further, these systems may each apply to work machines with a variety of types of traction devices. For example, while track type work machines are commonly configured with skid steer or differential steering systems, they may alternatively, or additionally, be configured with steering systems that vary a steering angle of one or more tracks. Similarly, wheeled work machines or vehicles may steer with a variable steering angle system, skid steer, and/or differential steering systems.

Work implement 20 may be any type of work implement and may include any type of work tool, such as, for example, a bucket, blade, grapple, jackhammer, shears, etc.

As shown in FIG. 1, work implement 20 may include a boom 28, a stick 30, and a work tool 32 attached to the end of stick 30. Boom 28 may be pivotably attached to frame 14. A boom actuator 34 may be attached to frame 14 and boom 28, such that a distal end 36 of boom 28 may be raised and lowered by actuation of boom actuator 34.

Distal end 36 of boom 28 may also be moved side-to-side. In the exemplary embodiment shown, boom 28 may be moved side-to-side by rotation of frame 14 relative to base 16 about an axis 38 in a direction indicated by an arrow 40. For purposes of this disclosure, the side-to-side movement of work implement 20 via rotational movement of frame 14 relative to base 16 shall be referred to as "swing". Vehicle 10 may also include an offset boom function by which boom 28 may be pivoted side-to-side relative to frame 14.

Stick 30 may be pivotably attached to boom 28 at a proximal end 42. A stick actuator 44 may be attached to boom 28 and stick 30 such that actuation of stick actuator 44 may cause stick 30 to extend and retract with respect to boom 28 in a manner of a jackknife. That is, a distal end 46 of stick 30 may be extended further away from frame 14, and retracted closer to frame 14 by actuating stick actuator 44.

Work tool 32 may be attached to distal end 46 of stick 30. While work tool 32 has been illustrated in FIG. 1 as a bucket 48, work tool 32 may be any type of work tool. Work tool 32 may be pivotably attached to distal end 46 of stick 30. A work tool pivot actuator 50 may be attached to stick 30 and work tool 32 such that actuation of work tool pivot actuator 50 may cause work tool 32 to pivot relative to stick 30.

Operator station 22 may be a cab as illustrated in FIG. 1, and may be attached to or integral with frame 14. Operator station 22 may include an operator seat 52, a first steering device, such as, for example, a steering wheel 54, a display 55, and at least one hand-operated work implement control device 56, e.g. a joystick. Steering wheel 54 may be operatively coupled to a first set of wheels 24 and/or second set of wheels 26 so as to control their directional movement. Steering wheel 54 may tilt and/or telescope relative to operator seat 52 in order to facilitate ingress and egress, or to provide a more open cab while operating other control devices. For example, steering wheel 54 may be tilted and/or telescoped out of the way while a secondary steering control system is active. Vehicle 10 may include two work implement control devices, one on each side of operator seat 52.

Work implement control device 56 may control multiple functions of vehicle 10, as, for example, operation of work implement 20 (including movements of boom 28, stick 30, and work tool 32), swing, propulsion of vehicle 10, steering, the cab raiser function, the offset boom function, etc.

Boom actuator 34, stick actuator 44, and work tool pivot actuator 50 may be any kind of actuators, such as, for example, hydraulic cylinders as shown in FIG. 1. Each hydraulic cylinder may be associated with its own hydraulic circuit in order to be independently controlled. Some work tools, such as bucket 48, may have a single actuator, and thus may be controlled by a single hydraulic circuit. Other types of work tools, such as grapple may include more than one actuator, and thus may be controlled by more than one hydraulic circuit. For example, grapple may be controlled by two or more hydraulic circuits. One circuit may control work tool pivot actuator 50, which may pivot the grapple in the same manner as it does bucket 48. Additionally, a second circuit may control an auxiliary function, such as rotation of the grapple.

One or more of the boom actuator 34, stick actuator 44, work tool pivot actuator 50 and all the others, like hydraulic cylinders, may be driven by one or more open hydraulic circuits 100.

Figure 2:
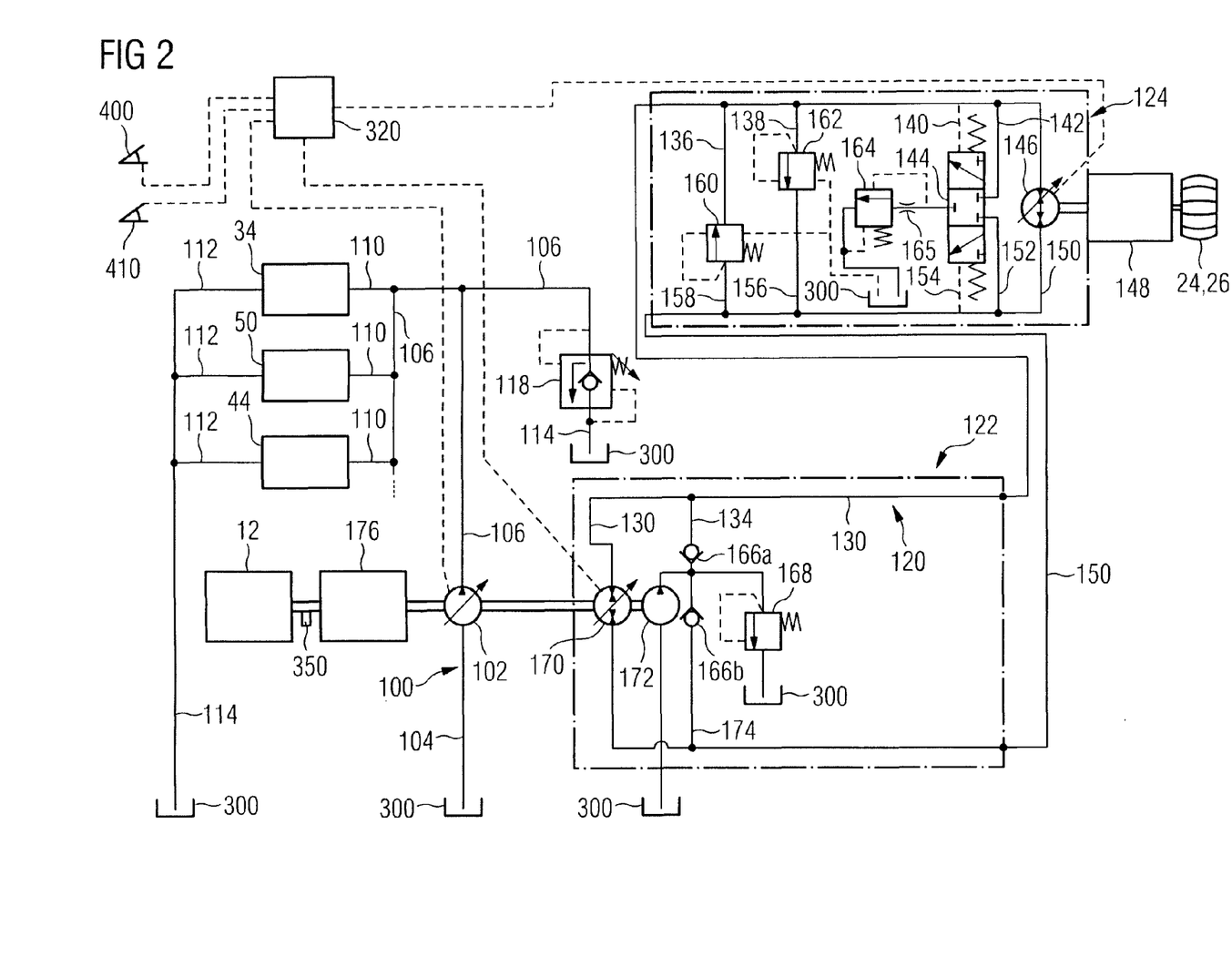
FIG. 2 is a diagrammatic illustration of a hydrostatic drive system for a vehicle, which may comprise an open circuit and a closed circuit according to an exemplary disclosed embodiment.
Figure 3:
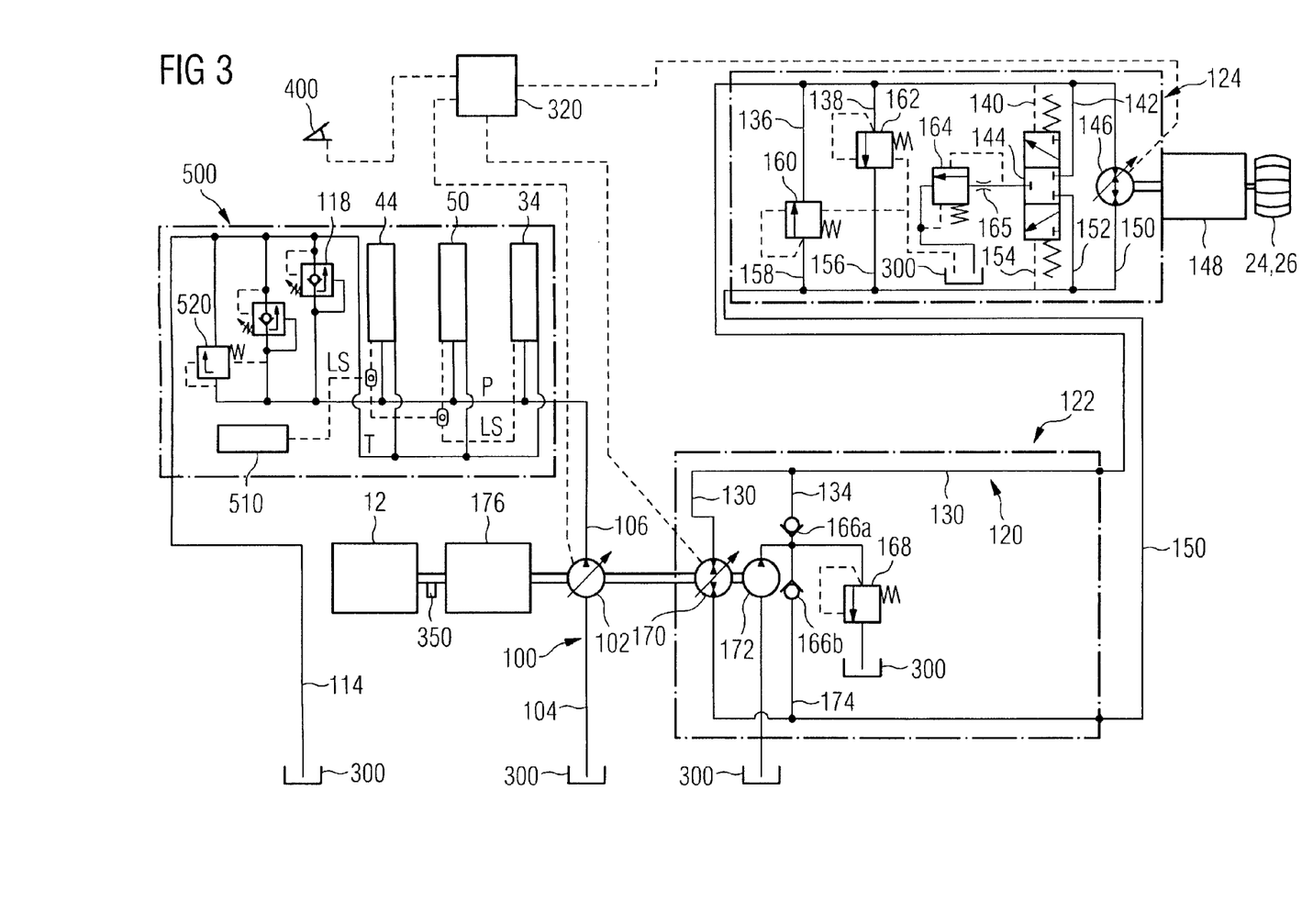
FIG. 3 is a diagrammatic illustration of another hydrostatic drive system for a vehicle, which may comprise an open circuit and a closed circuit according to an exemplary disclosed embodiment.

The wheel excavator 10 as shown in FIG. 1 may be equipped with a hydraulic drive as schematically shown in FIG. 2 or 3. This hydraulic drive may comprise a travel pump unit 122 and a travel motor unit 124. The travel pump unit 122 may include an auxiliary hydraulic pump 170, which may also be driven by diesel engine 12. Auxiliary hydraulic pump 170 may be configured as a variable displacement pump. As shown in FIG. 2, the auxiliary hydraulic pump 170 may also be operated as a hydraulic motor during braking. Auxiliary hydraulic pump 170 may be connected via a hydraulic supply line 130 to a hydraulic motor 146 of travel motor unit 124. Auxiliary hydraulic pump 170 may also be connected to a discharge side of hydraulic motor 146 via a hydraulic return line 150.

A boost pump 172 may be arranged in travel pump unit 122. Further, boost pump 172 may also be driven by internal combustion engine 12. A hydraulic line 134 connects to hydraulic line 130 and ends at a check valve 166a. A further hydraulic line 174 connected to hydraulic return line 150 may also be connected to a check valve 166b. A pressure regulator valve 168 connected to reservoir 300 may be connected to both check valves 166a, 166b and the output side of boost pump 172.

In travel motor unit 124, a three-way valve 144 may be arranged in parallel to hydraulic motor 146. Three-way valve 144 may be connected to hydraulic line 130 and hydraulic line 150 via hydraulic lines 140, 154, and via hydraulic lines 142 and 152. A throttle or orifice 165 may be connected to three-way valve 144 and to a pressure-limiting valve 164. Pressure limiting valve 164 may also be connected to reservoir 300. Valve 144 and valve 164 may form a flush and boost pressure valve unit.

In addition, two secondary pressure relief valves 160 and 162 may be connected to hydraulic lines 130 and 150 via hydraulic lines 136, 138, 156, 158.

Internal combustion engine 12 may be operatively connected to air conditioning and other parasitics like hydraulic actuators or the like and to a main hydraulic pump 102. Main hydraulic pump 102 may be constructed as a variable displacement pump. Main hydraulic pump 102 may be part of open hydraulic circuit 100. Main hydraulic pump 102 may be connected to reservoir 300 via a hydraulic line 104. A hydraulic supply line 106 may be connected to a number of hydraulic lines 110.

Hydraulic lines 110 may be connected to hydraulic consumers like boom actuator 34, stick actuator 44, and work tool pivot actuator 50. Other hydraulic consumers may also be connected via hydraulic lines 110 to the open hydraulic circuit and main hydraulic pump 102. Hydraulic lines 112 open into a hydraulic line 114 connected to reservoir 300.

An electronic control unit 320 may be connected to main hydraulic pump 102, auxiliary hydraulic pump 170, hydraulic motor 146. In an exemplary embodiment control unit 320 may also be connected to an accelerator pedal 400 and/or a braking pedal 410.

In another exemplary embodiment of the present disclosure hydraulic line 130 may be connected to a pressure sensor (not shown) measuring the inlet pressure of travel motor while travelling forward. Hydraulic line 150 may be connected to a further pressure sensor (not shown) measuring the inlet pressure of travel motor while travelling backward.

A pressure relief valve 118 may be permanently connected to the hydraulic supply line 106. Pressure relief valve 118 may be configured to avoid a pressure within open circuit 100 above a predetermined maximum operation pressure. The maximum operation pressure may be in a range of 350 to 450 bar, particularly 400 to 430 bar. Pressure relief valve 118 may be part of a main valve unit 500 as e.g. shown in FIG. 3. Pressure relief valve 118 may be connected to reservoir 300 via a hydraulic line 114.

Another exemplary embodiment of a hydrostatic vehicle drive is shown in FIG. 3. As far as components of this hydrostatic drive system are similar or identical to components shown in FIG. 2 further explanations hereto are omitted.

In the hydrostatic drive system shown in FIG. 3, a standard main valve unit 500 is provided. Main valve unit 500 may comprise the hydraulic consumers 34, 44, 50, pressure relief valve 118 and an unloading valve 520. In addition, the hydraulic consumers 33, 44, 50 may be connected to a load sensing pressure sensor 510.

INDUSTRIAL APPLICABILITY

A vehicle such as, e.g. a wheel excavator 10 as shown in FIG. 1, including a travel system as schematically shown in FIG. 2 may be operated as follows.

An operator may adjust the desired travel speed via steering wheel 54 or another control device as, for example, a pedal 400 in the area of the operator seat 52 within operator station 22 as shown in FIG. 1. A corresponding signal may be transmitted to electronic control unit 320 and the control unit 320 may vary the displacement of hydraulic pump 170 and/or hydraulic motor 146 for travelling vehicle 10 as desired.

In case that hydraulic braking of the vehicle 10 is accruing, hydraulic fluid in hydraulic supply line 150 may increase such that the pressure becomes higher than in hydraulic line 130. As soon as a predetermined pressure set at one of valves 160, 162 or 164 may be achieved throttling or flushing of hydraulic fluid may take place.

Hydraulic fluid flushed out of closed circuit 120 may be replaced by boost pump 172.

If even due to flushing and/or throttling of hydraulic fluid in the closed circuit too much load may be put on engine 12 controller 320 may vary the displacement of main pump 102 such that pressure in open circuit 100 may reach a maximum operation pressure set at pressure relief valve 118 or a pressure set at unloading valve 520 and hydraulic fluid may be discharged via pressure relief valve 118 and/or throttled at unloading valve 520. Simultaneously, the engine speed may be monitored via, e.g. engine speed sensor 350. If the engine speed may reach a maximum engine speed, e.g. 2000 RPM the displacement of main pump 102 may be increased to reduce the engine speed.

The displacement may be controlled such that during strong braking mode the engine speed is maintained in a maximum engine speed range, e.g. +/−5-10% of the maximum engine speed.

Strong braking mode may mean that energy/power is put on engine 12, but only as long as the engine speed is not exceeding the maximum engine speed. In case that the engine speed reaches the maximum engine speed controller 350 may vary the displacement of main pump 102 such that pressure in open circuit 100 may rise and exceed the maximum operation pressure. Consequently, hydraulic fluid may be discharge into reservoir 300 via pressure relief valve 118. Alternatively, the hydraulic fluid may be throttled at unloading valve 520. Hence, energy/power may be dissipated at different locations without exceeding a maximum engine speed and via already provided hydraulic components as, e.g., the open circuit pressure relief valve and/or the unloading valve.

In a normal operation mode, not including travelling at high speed, main hydraulic pump 102 outputs a volumetric flow of hydraulic fluid and the total hydraulic fluid under pressure may be guided to one or more of hydraulic consumers 34, 44, 50. When this hydraulic fluid circulating in the open circuit 100 leaves the hydraulic consumers 34, 44, and/or 50, the total hydraulic fluid flows to reservoir 300.

Simultaneously, auxiliary hydraulic pump 170 may output a volumetric flow of hydraulic fluid under pressure into hydraulic line 130 to hydraulic motor 146. Hydraulic motor 146 may then via gearbox 148 drive one or more wheels 24, 26 with the corresponding rotational speed such that excavator 10 travels as desired. Hydraulic fluid flows then from hydraulic motor 146 via hydraulic line 150 back to auxiliary hydraulic pump 170. Due to the closed hydraulic circuit of this travel unit, the auxiliary hydraulic pump 170 may be designed with a small size. The size of the hydraulic pump 170 may only provided such that it provides a maximum capacity to travel or propel the wheel excavator 10 with a relatively low travel speed.

Electronic control unit 320 may adjust the auxiliary hydraulic pump 170 and/or the hydraulic motor 146 such that a relatively low travel speed of wheel excavator 10 can be achieved.

As reservoir 300 is able to contain a large volume of hydraulic fluid, hydraulic fluid heated within the closed circuit 120 may mix with cool hydraulic fluid within reservoir 300. Accordingly, main hydraulic pump 102 may suck in relatively cool hydraulic fluid.

A benefit of the present disclosure may be that at least a part/percentage of energy generated in the closed circuit during travelling downwards, i.e. braking, may be transferred to the main variable displacement hydraulic pump of the open circuit. For avoiding overspeed of the internal combustion engine this energy may be dissipated out of the open circuit via the pressure relief valve constructed to avoid exceeding a maximum operation pressure in the open circuit. This pressure relief valve may be assigned two functions. The one function may be its common function, namely avoiding exceeding a maximum operation pressure in the open circuit. The second function may be that energy or power during braking, particularly during a strong braking mode, may be dissipated via this pressure relief valve without the need of any additional hydraulic components as in prior systems. This may safe costs and may reduce potential failures of the system due to oscillations.

The same may apply if instead or in addition to the pressure relief valve an unloading valve in the open circuit is utilized for throttling hydraulic fluid in the open circuit and, consequently, a part of energy transferred via the main variable displacement hydraulic pump from the closed circuit into the open circuit may be dissipated. Due to monitoring of the engine speed and varying the displacement of the main pump the engine may be loaded to the maximum without exceeding a maximum engine speed, e.g. 2000 RPM. For example, the engine speed may be controlled during braking such that it is within a maximum engine speed range of about +/−5-10% of the maximum engine speed.

Another benefit of the present disclosure may be that known braking technologies in the closed circuit may still be utilized during braking. Such known braking technologies may comprise using one or more secondary pressure relief valves in the closed circuit for throttling hydraulic fluid and the known flush and boost valve unit for flushing a part of hydraulic fluid into a reservoir. If the heating in the closed circuit may increase too much an appropriate part of the energy/power may be dissipated in the open circuit via already provided hydraulic components like a pressure relief valve and/or an unloading valve.

The auxiliary pump may also be named as "travel pump", and the hydraulic motor may also be named as "travel motor".

The expressions "open circuit" or "open hydraulic circuit" as used herein are synonyms for the identical subject-matter. The same applies to the expressions "closed circuit" and "closed hydraulic circuits".

The technical term "open circuit" may refer to a hydraulic circuit in which a hydraulic pump takes the total hydraulic fluid from a reservoir, and after the hydraulic fluid was supplied to a hydraulic consumers as, e.g., a hydraulic motor or an actuator, by means of the hydraulic pump the total hydraulic fluid returns to a reservoir. The reservoirs of the open circuit may be the same or may be different ones.

The technical term "closed circuit" may refer to a hydraulic circuit in which at least a part of the hydraulic fluid, which was supplied to a hydraulic consumer as, e.g., a hydraulic motor or an actuator, by means of a hydraulic pump returns to the hydraulic pump. A part of the hydraulic fluid circulating in the closed circuit may be guided to a reservoir, but at least a part of the total hydraulic fluid is returned to the hydraulic pump, particularly a major percentage of the total hydraulic fluid circulating in the closed circuit.

The technical terms "flush valve" and "purge valve" may be synonymously used for the same subject-matter.

A vehicle according to the present disclosure may be configured as, e.g., a wheel excavator, a wheel dozer, a wheel loader, a wheel tractor-scraper, a wheeled underground mining machine, a skid steer loader, a skidder, a road reclaimer, a wheeled industrial loader, a wheel compactor, or a feller buncher.

Although the preferred embodiments of this invention have been described herein, improvements and modifications may be incorporated without departing from the scope of the following claims.

The invention claimed is:

1. A hydrostatic drive system for a vehicle, comprising:
an open circuit including:
  a main variable displacement hydraulic pump configured to be driven by an internal combustion engine equipped with a speed sensor, the main variable displacement hydraulic pump being configured to supply hydraulic fluid to at least one hydraulic consumer via a hydraulic supply line, and
  a pressure relief valve connected to a reservoir, the pressure relief valve being connected to the hydraulic supply line such that hydraulic fluid in the hydraulic supply line is discharged into the reservoir if a preset maximum operation pressure is reached in the open circuit;
a closed circuit configured to propel the vehicle including:
  an auxiliary variable displacement hydraulic pump configured to be driven by the internal combustion engine and to propel the vehicle, and
  a hydraulic motor connected to the auxiliary variable displacement hydraulic pump; and
an electronic controller connected to the speed sensor and the main variable displacement hydraulic pump, the electronic controller being configured to run a strong braking mode in which the electronic controller at least partially increases the displacement of the main variable displacement hydraulic pump such that hydraulic fluid is discharged via the pressure relief valve into the reservoir if an engine speed is determined, based on a signal received from the speed sensor, which is higher than a predetermined maximum engine speed, wherein the electronic controller is configured to control the displacement of the main variable displacement hydraulic pump by increasing and decreasing the displacement during the strong braking mode such that the engine speed varies within a predetermined engine speed range including the predetermined maximum engine speed, and wherein the electronic controller is additionally configured to control at least one of the displacement of the auxiliary variable displacement hydraulic pump and a displacement of the hydraulic motor by increasing and decreasing the displacements during the strong braking mode such that the engine speed varies within a predetermined engine speed range including the predetermined maximum engine speed.

2. The hydrostatic drive system for a vehicle of claim 1, wherein the hydraulic motor is a variable displacement hydraulic motor.

3. The hydrostatic drive system for a vehicle of claim 1, further comprising a main valve unit configured to control the hydraulic fluid supply from the main variable displacement hydraulic pump to the at least one hydraulic consumer, the main valve unit including the pressure relief valve.

4. The hydrostatic drive system for a vehicle of claim 1, further comprising an unloading valve integrated in a main valve unit and connected to the reservoir, the unloading valve being adapted to discharge the hydraulic fluid output from the main hydraulic pump into the reservoir during the strong braking mode.

5. The hydrostatic drive system for a vehicle of claim 1, wherein the closed circuit further comprises at least one secondary pressure relief valve connected to a hydraulic supply line and a hydraulic return line such that during braking at least a part of hydraulic fluid in the closed circuit is throttled at the at least one secondary pressure relief valve and circulated in the closed circuit.

6. The hydrostatic drive system for a vehicle of claim 1, further comprising:
   a flush and boost valve unit connected in parallel to the hydraulic motor;
   a pressure limiting valve connected to the flush and boost valve unit and to a reservoir; and
   a boost pump provided in the closed circuit, the boost pump being configured to be driven by the internal combustion engine and to replace hydraulic fluid throttled at said pressure limiting valve of the flush and boost valve unit and flushed into the reservoir during braking.

7. The hydrostatic drive system for a vehicle of claim 1, the electronic controller being configured to run a soft braking mode as long as a predetermined engine speed is not reached, the soft braking mode including increasing the displacement of the auxiliary variable displacement hydraulic pump at least partially such that a part of hydraulic fluid circulating in the closed circuit is flushed into the reservoir.

8. A method of braking a vehicle, the vehicle comprising:
   an open circuit including a main variable displacement hydraulic pump configured to be driven by an internal combustion engine and to supply hydraulic fluid to at least one hydraulic consumer via a hydraulic supply line, and a pressure relief valve connected to a reservoir, the pressure relief valve being connected to a hydraulic supply line and being configured to discharge the hydraulic fluid in the hydraulic supply line into the reservoir if a preset pressure level is reached in the open circuit; and
   a closed circuit configured to propel the vehicle including an auxiliary variable displacement hydraulic pump configured to be driven by the internal combustion engine and to propel the vehicle, and a hydraulic motor connected to the auxiliary variable displacement hydraulic pump;
   the method comprising:
   receiving a signal indicating the engine speed of the internal combustion engine; and
   if an engine speed is determined, based on the signal received, which is higher than a predetermined maximum engine speed, running a strong braking mode including increasing the displacement of the main variable displacement hydraulic pump such that hydraulic fluid is discharged via the pressure relief valve into the reservoir, wherein the strong braking mode includes the step of varying the displacement of the auxiliary variable displacement hydraulic pump.

9. The method of claim 8, the strong braking mode further including controlling the displacement of the main variable displacement hydraulic pump by increasing and decreasing the displacement during the strong braking mode such that the engine speed is varying within a predetermined engine speed range including the predetermined maximum engine speed.

10. The method of claim 8, wherein the step of varying the displacement of the auxiliary variable displacement hydraulic pump includes increasing the displacement to a maximum displacement.

11. The method of claim 8, further comprising braking by varying the displacement of the auxiliary variable displacement hydraulic pump such that hydraulic fluid circulating in the closed circuit is one or more of partly flushed into the reservoir and partly throttled and circulated in the closed circuit.

12. A method of braking a vehicle including an open hydraulic circuit for supplying at least one hydraulic consumer, and a closed travel circuit, the method comprising the steps of:
   receiving a signal indicating an engine speed of an internal combustion engine for driving a main variable displacement pump of the open circuit and a variable displacement travel pump of the closed circuit; and
   if an engine speed is determined, based on the signal received, which is higher than a predetermined maximum engine speed, running a strong braking mode including controlling the displacement of the main variable displacement hydraulic pump by increasing and decreasing the displacement such that the engine speed varies within a predetermined engine speed range including a predetermined maximum engine speed resulting in that hydraulic fluid is discharged into a reservoir via a pressure relief valve connected to a hydraulic supply line of the open circuit, the pressure relief valve being configured to avoid a pressure in the open circuit above a maximum operation pressure, and wherein the strong braking mode includes varying the displacement of the variable displacement travel pump.

13. The method of claim 12, further including controlling the displacement of the variable displacement travel pump of the closed circuit for propelling the vehicle as desired.

14. The method of claim 12, wherein varying the displacement of the variable displacement travel pump includes increasing the displacement to a maximum displacement.

15. The method of claim 12, further including braking by varying the displacement of the variable displacement travel pump such that hydraulic fluid circulating in the closed circuit is one or more of partly flushed into the reservoir and partly throttled and circulated in the closed circuit.

16. The method of claim 15, further including driving a boost pump in the closed circuit by the internal combustion engine to replace fluid partly flushed out of the closed circuit into the reservoir.

* * * * *